US011231254B1

(12) United States Patent
Stephens et al.

(10) Patent No.: US 11,231,254 B1
(45) Date of Patent: Jan. 25, 2022

(54) SYSTEM FOR PHYSICALLY DEFEATING UNMANNED AERIAL VEHICLES

(71) Applicant: Government of the United States, as represented by the Secretary of the Air Force, Wright-Patterson AFB, OH (US)

(72) Inventors: Hunter I. Stephens, Hagatna, GU (US); Stephen M. Cunningham, Cuyahoga Falls, OH (US); Andrew J. Lichtsinn, Green Valley, AZ (US); Travis M. Edwards, Stuart, FL (US); Michael L. Anderson, Colorado Springs, CO (US); Cory A. Cooper, Monument, CO (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 277 days.

(21) Appl. No.: 16/266,394

(22) Filed: Feb. 4, 2019

Related U.S. Application Data

(60) Provisional application No. 62/626,233, filed on Feb. 5, 2018.

(51) Int. Cl.
*F41H 11/04* (2006.01)
*B64F 1/02* (2006.01)
*B64C 39/02* (2006.01)

(52) U.S. Cl.
CPC ............ *F41H 11/04* (2013.01); *B64C 39/024* (2013.01); *B64F 1/02* (2013.01); *B64C 2201/182* (2013.01)

(58) Field of Classification Search
CPC ..... B64C 39/027; B64C 2201/182; B64F 1/02; B64F 1/027; F41H 11/04; F41H 11/05
See application file for complete search history.

(56) References Cited

U.S. PATENT DOCUMENTS 4,884,171 A    11/1989   Maserang et al.
5,136,119 A     8/1992   Leyland
(Continued)

OTHER PUBLICATIONS

Black Hole Faraday Bag, EDEC Digital Forensics, Amazon.com, Accessed Feb. 1, 2018.
(Continued)

*Primary Examiner* — Richard R. Green
*Assistant Examiner* — Ashesh Dangol
(74) *Attorney, Agent, or Firm* — AFMCLO/JAZ; Timothy Barlow (57) ABSTRACT

A system for defeating a threat unmanned aerial vehicle. The system includes a friendly unmanned aerial vehicle, a capturing device configured to be suspended from the friendly unmanned aerial vehicle for arresting a threat unmanned aerial vehicle, and one or more load-limited release mechanisms for removably suspending a releasable portion of the capturing device from the friendly unmanned aerial vehicle. In certain embodiments, the load-limited release mechanisms are configured to release the entirety of the capturing device from the friendly unmanned aerial vehicle upon capture of the threat unmanned aerial vehicle. In other embodiments, the load limited release mechanisms are configured to release only a peripheral portion of the capturing device to reposition a captured unmanned aerial vehicle to a central portion of the capturing device for carrying the captured vehicle to a remote location.

3 Claims, 7 Drawing Sheets

(56) References Cited

U.S. PATENT DOCUMENTS

| | | | |
|---|---|---|---|
| 5,437,230 A * | 8/1995 | Harris | B63G 7/00 |
| | | | 102/302 |
| 5,525,988 A | 6/1996 | Perkins et al. | |
| 5,908,043 A | 6/1999 | Paes et al. | |
| 6,065,239 A | 5/2000 | Thomas et al. | |
| 6,626,077 B1 | 9/2003 | Gilbert | |
| 8,375,837 B2 | 2/2013 | Goossen et al. | |
| 8,723,053 B2 | 5/2014 | Winch et al. | |
| 9,085,362 B1 | 7/2015 | Kilian et al. | |
| 9,527,604 B2 | 12/2016 | Melish et al. | |
| 9,862,489 B1 | 1/2018 | Weinstein et al. | |
| 9,896,221 B1 * | 2/2018 | Kilian | B64C 39/024 |
| 10,005,556 B2 | 6/2018 | Aagaah et al. | |
| 2015/0060129 A1 | 3/2015 | Judy et al. | |
| 2017/0253348 A1 | 9/2017 | Ashdown et al. | |
| 2017/0356726 A1 | 12/2017 | Theiss et al. | |
| 2018/0105271 A1 | 4/2018 | Wypyszynski et al. | |
| 2018/0224262 A1 * | 8/2018 | Klein | F42D 5/045 |

OTHER PUBLICATIONS

Gibbs, Samuel, Drone wars: new UAV interceptor billed as net-firing solution to rogue flying, The Guardian, Jan. 12, 2016.

Goodrich, Marcia, Drone Catcher: "Robotic Falcon" can Capture, Retrieve Renegade Drones, Michigan Technological University, Jan. 31, 2018.

Liberatore, Stacy, Tokyo Police Reveal Bizarre 'UAV drone catcher', Daily Mail, Dec. 11, 2015.

Moseman, Andrew, This Drone Interceptor Captures Your Pathetic Puny Drone With a Net, Popular Mechanics, Feb. 11, 2015.

* cited by examiner

SYSTEM FOR PHYSICALLY DEFEATING UNMANNED AERIAL VEHICLES

CROSS REFERENCE TO RELATED APPLICATION

This application claims priority to U.S. Provisional Application Ser. No. 62/626,233 filed Feb. 5, 2018, entitled "Unmanned Aerial System Neutralization System," the entire contents of which is incorporated herein by reference.

GOVERNMENT INTEREST

The invention described herein may be manufactured, used, and licensed by or for the U.S. Government.

FIELD OF THE INVENTION

The present disclosure relates generally to capturing unmanned aerial vehicles. More particularly, the present disclosure relates to a system for defeating unmanned aerial vehicles by providing a controlled drop of the captured vehicle and/or the ability to transport the captured vehicle to a remote location.

BACKGROUND OF THE INVENTION

An unmanned aerial vehicle ("UAV"), commonly known as a drone, is an aircraft without a human pilot physically located within or on the aircraft. A UAV is a component of an unmanned aerial system ("UAS"), which generally includes one or more UAVs, a ground-based controller, and a system of communications between the UAVs and the ground-based controller. In the past several years, the prevalence and capabilities of UASs has increased rapidly from use by hobbyists for racing purposes, taking video and pictures of landscapes, etc., to use by the U.S. Department of Defense ("DoD") and other military forces to support tactical, operational, and strategic operations. In this regard, the U.S. DoD now categorizes UAVs into five groups, with each category increasing in capability. For example, "Group 1" generally includes UAVs that have a maximum takeoff weight of twenty pounds, that operate at an altitude below 1,200 feet above ground level ("AGL"), and that have a maximum speed of one hundred knots. "Group 2" generally includes UAVs that have a maximum takeoff weight of between twenty-one to fifty-five pounds, that operate at an altitude below 3,500 feet AGL, and that have a maximum speed of less than 250 knots. Groups 3-5 then include UAVs with a higher maximum takeoff weight, ability to operate at higher altitudes, and/or at higher speeds as compared to Group 2 UAVs.

Unfortunately, the use of UASs has quickly turned from recreational and defense purposes to that of malicious intent. For example, the Islamic State in Iraq and Syria ("ISIS") commonly use home-modified and commercial, off-the-shelf UASs (typically Group 1 UAVs) in order to monitor troop movements and for propaganda purposes in the Middle East. More recently, there has been a push by ISIS to weaponize these systems to cause direct harm and loss of life to allied forces. For purposes of the present disclosure, a UAS intended to be weaponized or otherwise used for malicious intent is referred to as a "threat unmanned aerial system" (or "threat UAS"). Similarly, a UAV intended to be weaponized or otherwise used for malicious intent is referred to as a "threat unmanned aerial vehicle" (or "threat UAV").

To defeat threat UAVs, electronic warfare systems have been developed that are designed to disrupt the connection between the threat UAV and its operator UAS using electronic blocking/disrupting measures. However, with the ability to program a threat UAVs flight path prior to its takeoff, disrupting this communication with the operator becomes unreliable. Another disadvantage of using electronic disruption systems for defeating threat UAVs is the inability to control the flight of the threat UAV to a safe/remote location if needed.

To defeat threat UAVs, systems have also been developed for arresting/immobilizing threat UAVs using a ground- or air-based net launching system to entangle a threat UAV. While these systems are somewhat effective at near distances, such launch systems have several limitations and disadvantages such as the deployment mechanisms for launching the net being largely line of sight and the difficulty in arresting the threat UAV without missing. Thus, multiple attempts are often needed, resulting in additional time and complexity needed for re-loads to the launching system. Similar to electronic disruption systems, net launching systems also have the disadvantage of an inability to control the flight of an arrested threat UAV to a safe/remote location when needed, such as when the threat UAV is carrying a malicious payload.

In view of the above and other considerations, there is a need for a system for defeating a threat UAS by capturing threat UAVs being controlled by the threat UAS in a controlled and effective manner. Depending on the purpose of the threat UAV (e.g., delivering a payload vs. performing surveillance), there is also a need for a system that is capable of carrying an arrested threat UAV to a remote/safe location for controlled destruction and to gather any available intelligence.

SUMMARY OF THE INVENTION

According to one embodiment of the disclosure, the above and other needs are met by an unmanned aerial system for defeating a threat unmanned aerial vehicle. The unmanned aerial system includes a friendly unmanned aerial vehicle, a capturing device configured to be suspended from the friendly unmanned aerial vehicle for arresting the threat unmanned aerial vehicle, and one or more load-limited release mechanisms for removably suspending a releasable portion of the capturing device from the friendly unmanned aerial vehicle. The one or more load-limited release mechanisms are configured to release the releasable portion of the capturing device from the friendly unmanned aerial vehicle upon the capturing device arresting the threat unmanned aerial vehicle in the releasable portion.

According to certain embodiments, the friendly unmanned aerial vehicle and capturing device are operable to carry an arrested threat unmanned aerial vehicle to a remote location, the one or more load-limited release mechanisms removably suspend the releasable portion from the friendly unmanned aerial vehicle along a peripheral portion of the capturing device, the capturing device is securely suspended from the friendly unmanned aerial vehicle along a central portion of the capturing device, and the one or more load-limited release mechanisms are positioned and configured to release the releasable portion of the capturing device upon the capturing device arresting the threat unmanned aerial vehicle in the peripheral portion such that the arrested threat unmanned aerial vehicle is repositioned in the central portion of the capturing device. In some embodiments, the system includes a suspension rod connected to the friendly unmanned aerial vehicle for removably suspending the peripheral portion of the capturing device to the friendly unmanned aerial vehicle along a periphery of the suspension rod using the one or more load-limited release mechanisms and for securely suspending the central portion of the capturing device along a central portion of the suspension rod. In some embodiments, the system further includes an adapter for removably connecting the suspension rod to the friendly unmanned aerial vehicle and a controller configured to communicate with the friendly unmanned aerial vehicle. According to this embodiment, the adapter is configured to release the suspension rod and capturing device from the unmanned aerial vehicle upon commands from the controller.

According to other embodiments, the releasable portion of the capturing device includes the entire capturing device such that the capturing device is fully released from the friendly unmanned aerial vehicle upon the arresting of the threat unmanned aerial vehicle within any portion of the capturing device. In some embodiments, the capturing device includes one or more deployable parachutes that are connected to the capturing device and stored underneath the friendly unmanned aerial vehicle prior to deployment. According to this embodiment, the one or more deployable parachutes are configured to be deployed upon the capturing device being released from the friendly unmanned aerial vehicle. In some embodiments, the system includes a suspension rod extendable from a compact storage position to an extended capturing position connected to the friendly unmanned aerial vehicle and a plurality of load limited release mechanisms for removably suspending the capturing device to the suspension rod.

According to certain embodiments, the one or more load-limited release mechanisms are configured to release the releasable portion of the capturing device based on both a weight of the arrested threat unmanned aerial vehicle and a sharp movement of the friendly unmanned aerial vehicle.

According to another embodiment of the disclosure, a system for defeating a threat unmanned aerial vehicle includes an unmanned aerial system and a friendly unmanned aerial vehicle having an arresting assembly configured to receive commands from the unmanned aerial system. The arresting assembly includes a capturing device for arresting a threat unmanned aerial vehicle having at least one peripheral portion and a central portion, a capturing device expanding system configured to horizontally and vertically expand the capturing device upon one or more commands from the unmanned aerial system such that the capturing device is suspended from the friendly unmanned aerial vehicle in a net capturing position, and one or more load-limited release mechanisms for removably suspending the at least one peripheral portion of the capturing device from the capturing device expanding system. According to this embodiment, when the threat unmanned aerial vehicle is arrested in the at least one peripheral portion of the capturing device, the one or more load-limited release mechanisms are configured to release the at least one peripheral portion of the capturing device from the capturing device expanding system such that the arrested threat unmanned aerial vehicle is repositioned in the central portion of the capturing device.

According to certain embodiments, the capturing device expanding system includes a suspension rod configured to extend from a rod flight position to a rod capturing position for horizontally expanding the capturing device with respect to the friendly unmanned aerial vehicle, the one or more load-limited release mechanisms being removably suspended to at least one peripheral portion of the suspension rod and the central portion of the capturing device being securely suspended from a central portion of the suspension rod. In some embodiments, the capturing device expanding system further includes a housing portion disposed below the suspension rod for housing the capturing device in a housing configuration. According to this embodiment, the housing portion is configured to move from the housing configuration to a releasing configuration for vertically expanding the capturing device with respect to the friendly unmanned aerial vehicle.

According to certain embodiments, the arresting assembly further includes an adapter for connecting the capturing device expanding system to the friendly unmanned aerial vehicle, the adapter configured to release the capturing device expanding system upon one or more commands from the unmanned aerial system.

According to certain embodiments, the system further includes a plurality of arresting assemblies each including an adapter for individually and removably connecting each arresting assembly to the friendly unmanned aerial vehicle.

According to yet another embodiment of the disclosure, a method for defeating a threat unmanned aerial vehicle includes providing a friendly unmanned aerial vehicle including a capturing device configured to be suspended from the friendly unmanned aerial vehicle for arresting the threat unmanned aerial vehicle and one or more load-limited release mechanisms for removably suspending a releasable portion of the capturing device from the friendly unmanned aerial vehicle. The method further includes flying the friendly unmanned aerial vehicle in proximity of the threat unmanned aerial vehicle and arresting the threat unmanned aerial vehicle using the capturing device suspended from the friendly unmanned aerial vehicle. According to this embodiment, when the threat unmanned aerial vehicle is arrested in the releasable portion of the capturing device, the one or more load-limited release mechanisms are configured to release the releasable portion of the capturing device from the friendly unmanned aerial vehicle.

According to certain embodiments, the releasable portion of the capturing device includes the entire capturing device such that the capturing device is fully released from the friendly unmanned aerial vehicle upon the arresting of the threat unmanned aerial vehicle within any portion of the capturing device. According to some embodiments, the capturing device includes one or more deployable parachutes that are connected to the capturing device, the method further including deploying the one or more deployable parachutes upon the capturing device being released from the friendly unmanned aerial vehicle.

According to other embodiments, the capturing device includes a suspension rod for suspending the capturing device from the friendly unmanned aerial vehicle. The suspension rod includes a peripheral portion and a central portion. The releasable portion of the capturing device is releasably suspended from the peripheral portion of the suspension rod using the one or more load-limited release mechanisms. A central portion of the capturing device is securely suspended to the central portion of the suspension rod. According to this embodiment, the method further includes repositioning the threat unmanned aerial vehicle to the central portion of the capturing device when the threat unmanned aerial vehicle is arrested in the releasable portion of the capturing device.

According to certain embodiments, the friendly unmanned aerial vehicle includes an adapter for removably connecting the suspension rod to the friendly unmanned aerial vehicle. The adapter is configured to release the suspension rod and capturing device from the unmanned aerial vehicle upon commands from an unmanned aerial system configured to communicate with the friendly unmanned aerial vehicle.

According to certain embodiments, the capturing device is a net and the friendly unmanned aerial vehicle includes a net expander configured to horizontally and vertically expand the net upon one or more commands from an unmanned aerial system. According to this embodiment, the method further includes expanding the net using the net expander in the proximity of the threat unmanned aerial vehicle. According to some embodiments, the friendly unmanned aerial vehicle includes an adapter for removably connecting the net expander to the friendly unmanned aerial vehicle. According to this embodiment, the method further includes flying an arrested threat unmanned aerial vehicle disposed within the central portion of the net to a remote location and sending one or more commands from the unmanned aerial system to the adapter to disconnect the net expander and net from the friendly unmanned aerial vehicle to drop the arrested threat unmanned aerial vehicle at the remote location.

BRIEF DESCRIPTION OF THE DRAWINGS

Other embodiments of the disclosure will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Figure 1:
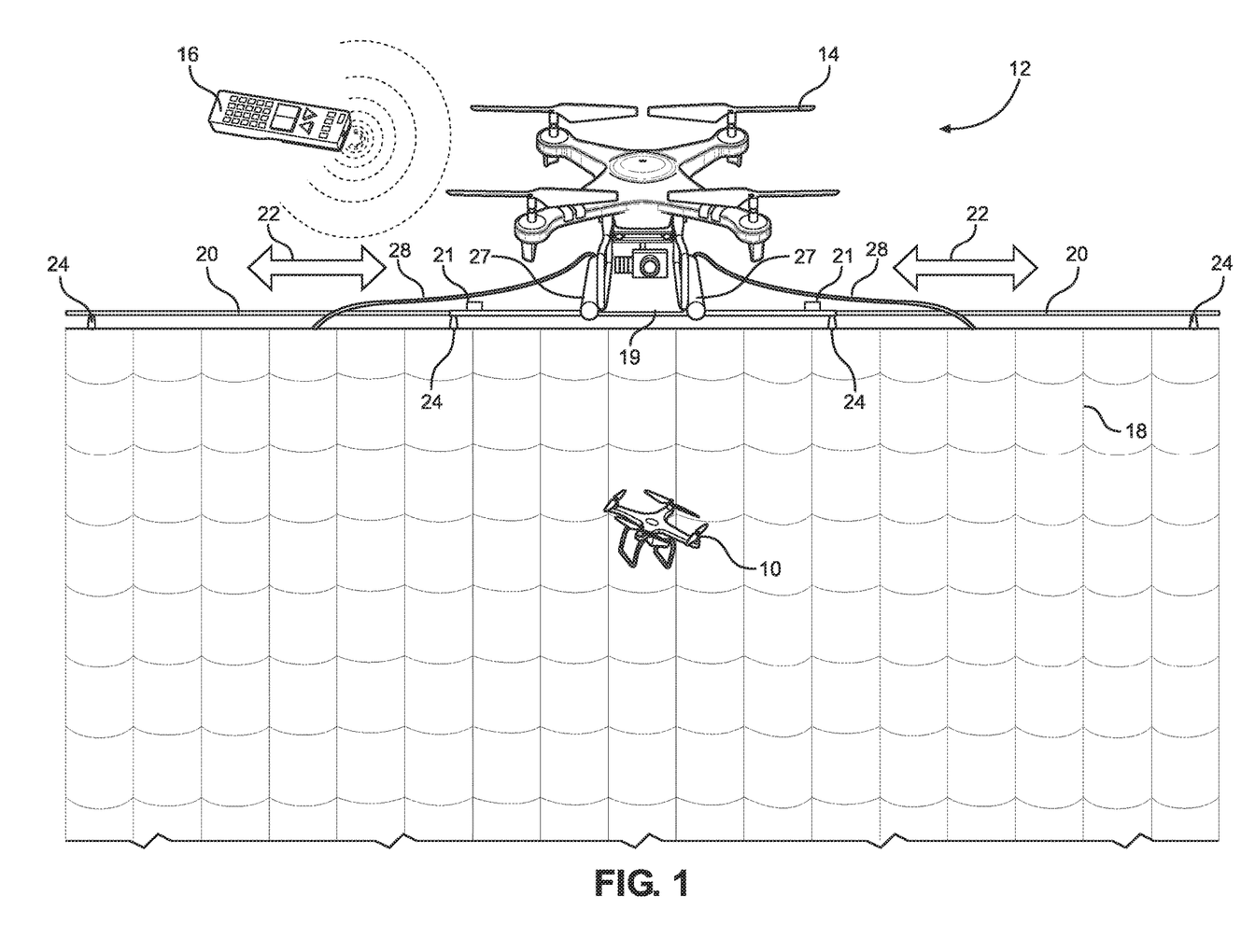
FIG. 1 depicts a friendly UAS having a capturing device in an extended deployed position for capturing a threat UAV according to one embodiment of the disclosure.

Referring to FIG. 1, a "friendly" UAS 12 for defeating a threat UAV 10 is depicted according to an exemplary embodiment of the disclosure. The friendly UAS 12 includes a friendly UAV 14 that is configured to be operated by a remote controller 16 using wireless communication technologies as known in the art. According to this embodiment, the friendly UAV 14 is depicted as a commercially available DJI Phantom IV drone, which is a Group 1 UAV according to US DoD classifications. Advantages of using a Group 1 UAV within the embodiment of FIG. 1 include greater mobility for pursuing similar Group 1 threat UAVs while minimizing expenses. Further, the embodiment of FIG. 1 is intended to minimize modifications needed to commercially available UASs such as the DJI Phantom IV. However, it should be understood that various types of UAVs with varying capabilities may be selected/utilized for the embodiment of FIG. 1, as well as other embodiments described herein, based on resources available and the capabilities needed in the friendly UAV 14 for a particular objective. In most embodiments, the capabilities needed for the friendly UAV 14 will largely depend on (1) the weight of the threat UAVs 10 being pursued; and (2) whether the friendly UAV 14 is needed to transport a captured threat UAV 10 to a location that is different than the location in which the threat UAV 10 is captured.

With continued reference to FIG. 1, friendly UAS 12 further includes a capturing device 18 configured to be suspended from the friendly UAV 14 for capturing/immobilizing the threat UAV 10. The capturing device 18 is preferably in the form of a net for rapidly entangling the rotor blades of the threat UAV 10. However, it should be understood that the capturing device 18 may take other forms such as individual strings, streamers, a light weight sheet, tarp, etc. so long as the capturing device 18 is able to be suspended from the friendly UAV 14 during flight of the UAV. When the capturing device 18 is in the suspended position as shown in FIG. 1, the capturing device 18 is considered to be deployed. To capture a threat UAV 10, the friendly UAV 14 with a deployed capturing device 18 is then flown in the proximity of the threat UAV 10 such that the threat UAV 10 gets caught in the capturing device 18. Advantageously, friendly UAV 14 with suspended capturing device 18 does not require the friendly UAV to include any launch-based systems such as explosive charges, compressed air, or other ammunition type charges to deploy the capturing device 18. Further, the capturing device 18 can be continually utilized until a threat UAV 10 is caught in the capturing device 18 (as compared to launch systems where misses of the capturing device would require a new capturing device to be loaded into the launching system).

In preferred embodiments, the friendly UAS 12 includes a suspension rod 20 secured to a bottom surface of the friendly UAV 14 using an adapter plate 19. The capturing device 18 is then removably suspended from the friendly UAV 14 via the suspension rod 20. As indicated by arrows 22, the suspension rod 20 is preferably extendable from a compact position (e.g., storage or flight position as depicted in the related embodiment of FIG. 5) to an extended position (e.g., capturing position as depicted in FIG. 1). While the suspension rod 20 may take many forms, suspension rod 20 is preferably formed of a plurality of telescoping carbon-fiber composite rods to provide a lightweight suspension rod 20 with sufficient strength to support a threat UAV 10 caught in the capturing device 18.

In certain embodiments, the friendly UAS 12 may be configured to extend suspension rod 20 from the compact position to the extended position during flight by controller 16. For example, the suspension rod 20 may include one or more actuators 21 that are able to be remotely controlled by controller 16. The suspension rod 20 may then be spring loaded to the compact position such that activation/release of the actuators 21 by controller 16 causes the suspension rod 20 to be automatically expanded to the capturing position. In certain embodiments, the extended capturing position of the suspension rod 20 may also be configured to include a plurality of positions that allows for varying horizontal lengths/footprints of the capturing device 18 in the deployed position. For example, the suspension rod 20 could be formed into a plurality of telescoping segments each with their own actuators 21. In other embodiments, the suspension rod 20 is manually extended pre-flight to reduce the complexity of the friendly UAS 12. According to this embodiment, the extended capturing position of the suspension rod 20 may also be configured to include a plurality of positions that allows for varying horizontal lengths/footprints of the capturing device 18 in the deployed position.

Figure 2:
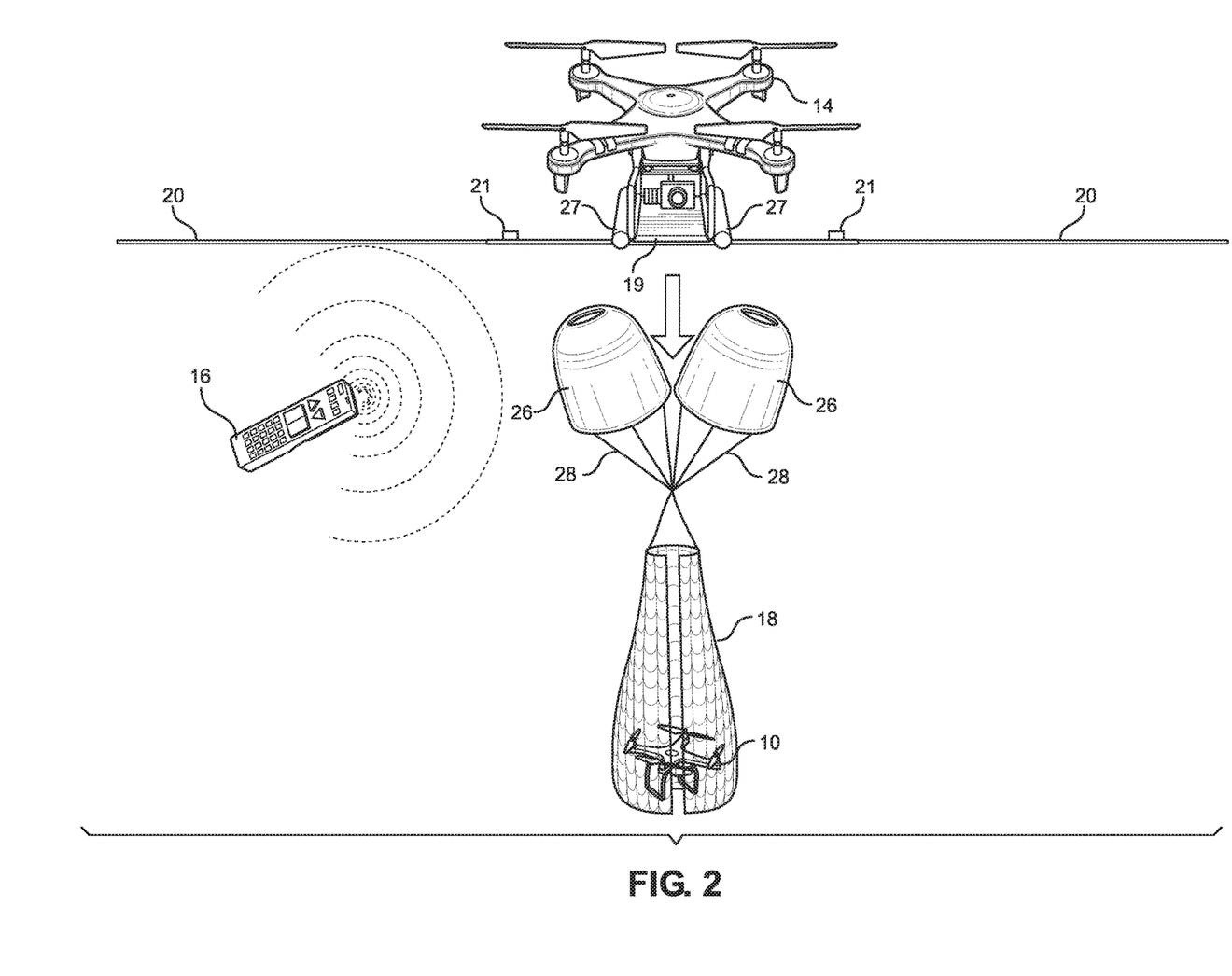
FIG. 2 depicts the friendly UAS of the embodiment of FIG. 1 after arresting the threat UAV such that the capturing device with the threat UAV is released to the ground according to one embodiment of the disclosure.

According to certain embodiments, and with particular reference to the sequence shown n FIGS. 1-2, the entirety of the capturing device 18 is removably suspended to the suspension rod 20 using one or more load-limited release mechanisms 24 that are configured to release the capturing device 18 from the suspension rod 20 upon arrest of a threat UAV 10 anywhere within the capturing device 18. It should be understood that the load-limited release mechanisms 24 may take various forms such as adhesive, magnets, friction clips, Velcro, etc. so long as they are positioned and configured to release the capturing device 18 upon arrest of a threat UAV 10 by the friendly UAV 14. In certain embodiments, an "arrest" of a threat UAV 10 by the friendly UAS 12 may include both a capture of the threat UAV 10 within the capturing device 18 and a sharp movement of the friendly UAV 14. In other words, to help prevent a potential false release of the capturing device 18 by the load limited release mechanisms 24, the load limited release mechanisms 24 may be positioned and configured to release the capturing device 18 based on both the weight of the threat UAV 10 that is captured in the capturing device 18 and a sharp movement (e.g., upward thrust) of the friendly UAV 14. In other embodiments, the load limited release mechanisms 24 are configured to release the capturing device 18 from the suspension rod 20 as soon as a threat UAV 10 is caught within the capturing device without necessarily requiring any specific movement of the friendly UAV 14.

More specifically, the attachment force of the load limited release mechanisms 24 can vary along a scale that includes an attachment force that is greater than a spacing-proportioned weight of the capturing device 18 at its lower limit and an attachment force that is substantially equal to or a little less than a spacing-proportioned weight of the expected threat UAV 10 at its upper limit. In embodiments in which it is intended to further require a sharp movement of the friendly UAV 14 to release the capturing device 18, the attachment force should be closer to the spacing-proportioned weight of the expected threat UAV 10 (i.e., near the upper limit on the scale described above). On the other hand, for embodiments in which it is intended for the threat UAV 10 to be immediately released upon capture without necessarily requiring a sharp movement by the friendly UAV 14, the attachment force should be less than the spacing-proportioned weight of the expected threat UAV 10 (i.e., more significantly below the upper limit on the scale described above). It should be understood that the attachment force between the capturing device 18 and the suspension rod 20 can be varied based on the type of load limited release mechanisms 24 selected and/or the number of load limited release mechanisms 24 provided along the length of the suspension rod 20.

With continued reference to FIGS. 1-2, the friendly UAS 12 may further include one or more deployable parachutes 26 connected to the capturing device 18, such as with drawstring 28 or similar attachments. The deployable parachutes 26 are configured to be deployed upon the capturing device 18 being released from the suspension rod 20. For example, according to certain embodiments, the deployable parachutes 26 are configured to be stored underneath the friendly UAV 14 in storage tubes 27 as depicted in FIG. 1. Upon the capturing device 18 being released from the suspension rod 20 by load limited release mechanisms 24, the deployable parachutes 26 are deployed as a result of the drawstring 28 pulling the parachutes 26 out from the storage tubes 27 as depicted in FIG. 2. Once the parachutes 26 are pulled out of their storage tubes 27, the threat UAV 10 entangled in capturing device 18 descends to the ground in a controlled manner.

In operation of the embodiment of FIGS. 1-2, the friendly UAV 14 having capturing device 18 is operated by controller 16 to pursue a threat UAV 10. In certain embodiments, the capturing device 18 is configured to be deployed into the extended capturing position as shown in FIG. 1 by controller 16 when it is in proximity to the threat UAV 10. In other embodiments, the capturing device 18 is manually deployed into the extended capturing position shown in FIG. 1 prior to flight. When the threat UAV 10 is arrested by the friendly UAV 14, the one or more load limited release mechanisms 24 are configured to release the capturing device 18 from the suspension rod 20. In certain embodiments, the one or more load limited release mechanisms 24 are configured to release the capturing device 18 from the suspension rod 20 based simply on the weight of the threat UAV 10. In other embodiments, the one or more load limited release mechanisms 24 are configured to release the capturing device 18 from the suspension rod 20 based on both the weight of the threat UAV 10 and a sharp movement (e.g., upward thrust) of the friendly UAV 14. Upon the release of the capturing device 18 from the suspension rod 20, parachutes 26 are deployed as a result of drawstring 28 pulling the parachutes 26 out of storage tubes 27 disposed underneath the friendly UAV 14. The parachutes 26 provide a controlled descent of the threat UAV 10 to the ground such that the threat UAV 10 may be recovered, inspected, and/or reprogrammed if desired.

The embodiment of FIGS. 1-2 is believed to be particularly useful in situations in which the threat UAV 10 being pursued is limited to an intelligence, surveillance, or reconnaissance mission (i.e., the threat UAV 10 is not believed to include a payload or other type of weapons capability) and/or the friendly UAV 14 is attempting to arrest the threat UAV 10 in a remote location (i.e., a sufficient distance away from any valuable assets that could be destroyed by any payloads being carried by a threat UAV 10). However, in other situations, it may be desirable to remove a threat UAV 10 from the immediate vicinity in which the threat UAV 10 is captured. Thus, referring to FIGS. 3-4, an alternate embodiment of FIGS. 1-2 is provided in which the load limited release mechanisms 24 of a friendly UAS 50 are disposed only along a peripheral portion of the suspension rod 20. The capturing device 18 is then securely connected to a central portion of the suspension rod 20 using any number of secure connection mechanisms 25 as known in the art. When the threat UAV 10 is captured by the central portion of the capturing device 18, the friendly UAV 14 is able to fly the arrested threat UAV 10 to a remote/secure location. On the other hand, capturing of the threat UAV 10 in the peripheral portion of the capturing device 18 may result in an imbalancing of the friendly UAV 14, which would make it difficult to fly the friendly UAV 14 to a remote/secure location. Thus, with reference to FIG. 4, providing a releasable portion of the capturing device 18 only along the periphery of the capturing device 18 (in contrast to the entirety of the capturing device 18 being the releasable portion as described above with respect to FIGS. 1-2) allows a threat UAV 10 captured in the peripheral portion of the capturing device 18 to be repositioned to the central portion of the capturing device 18. Once repositioned to the central portion of the capturing device 18, the friendly UAV 14 is properly balanced to better transport the arrested threat UAV 10 to a remote/safe location.

Figure 3:
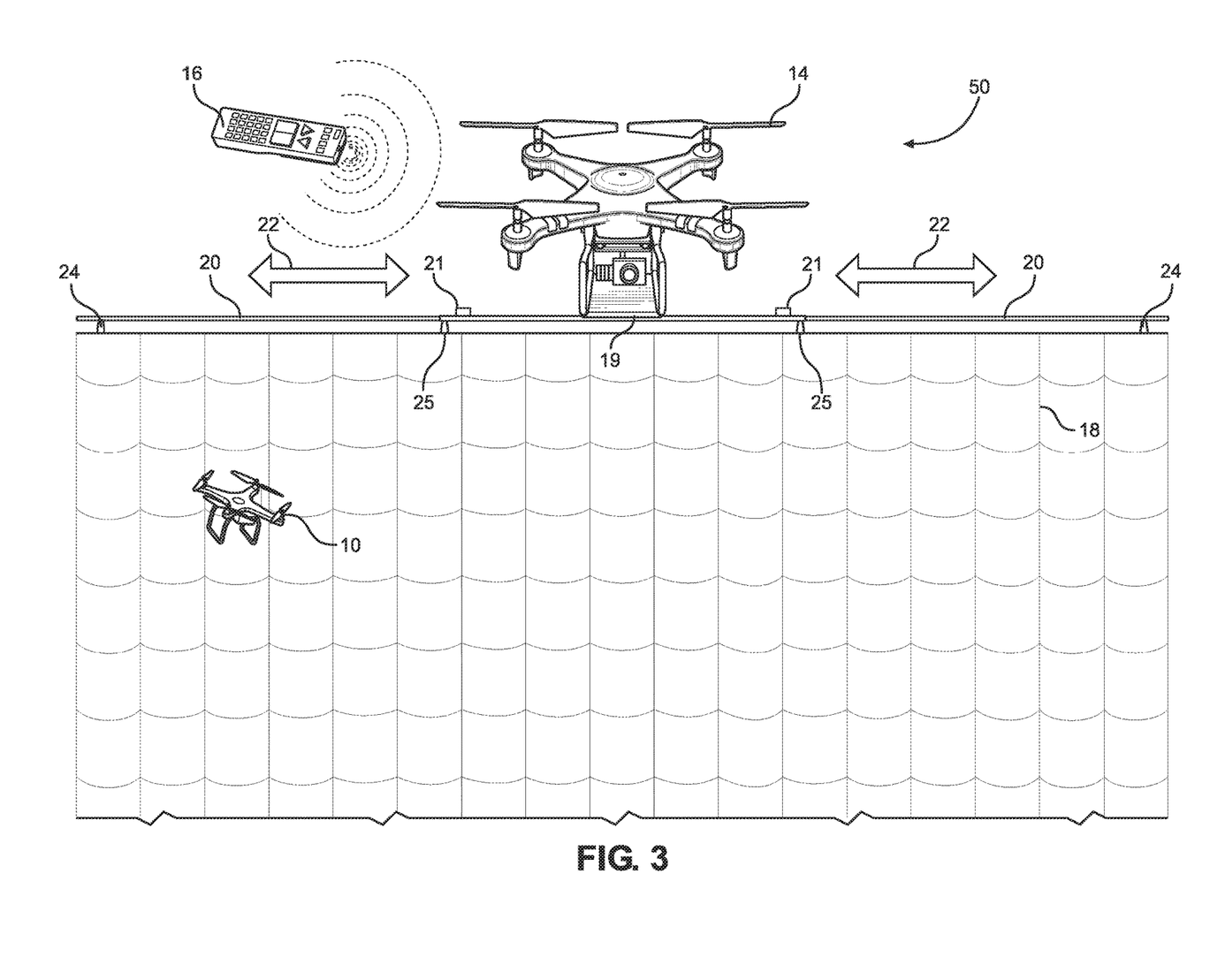
FIG. 3 depicts a friendly UAS having a capturing device in an extended deployed position for capturing a threat UAV according to one embodiment of the disclosure.
Figure 4:
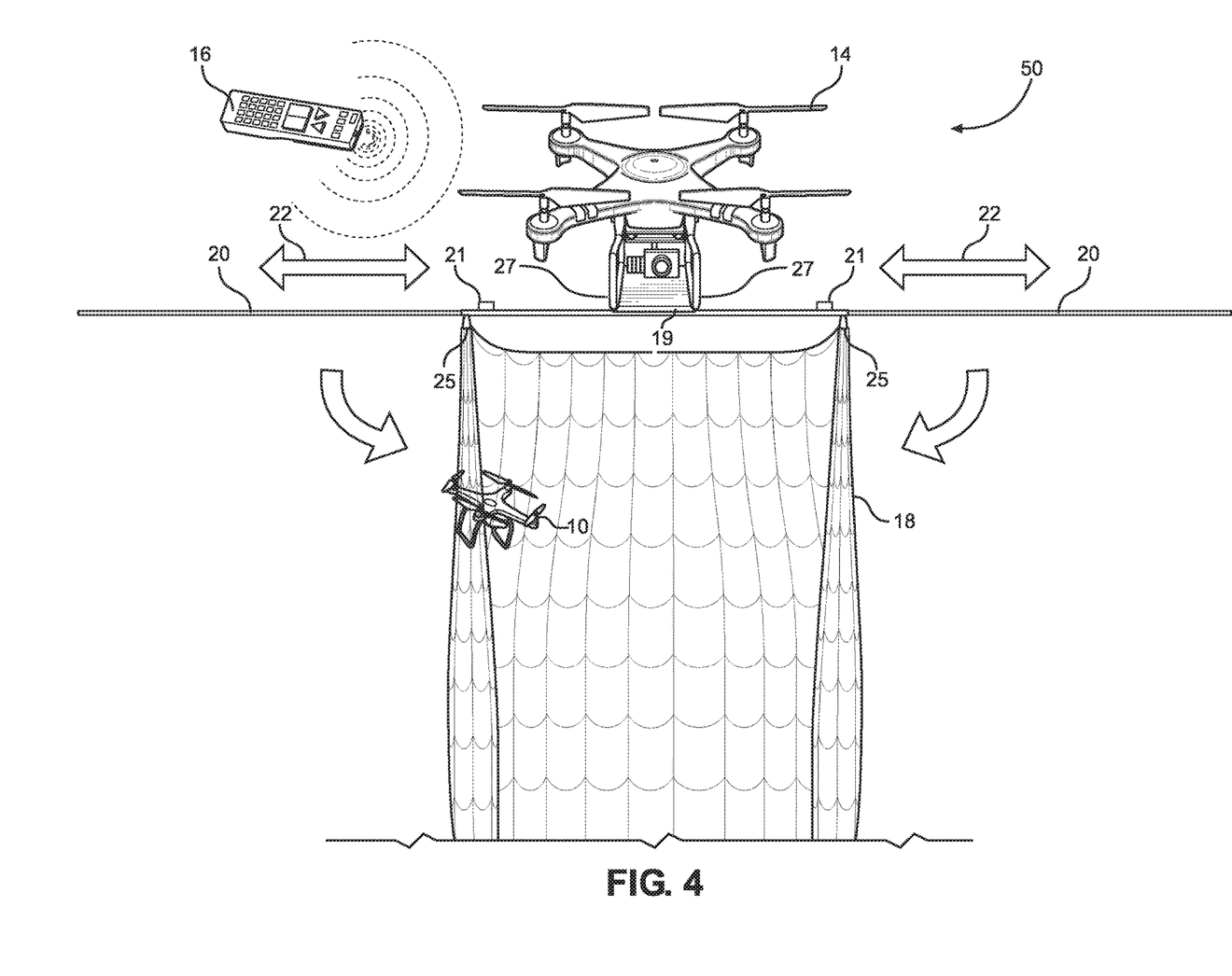
FIG. 4 depicts the friendly UAS of the embodiment of FIG. 3 after arresting the threat UAV in a peripheral portion of the capturing device such that it is being repositioned into the central portion of the capturing device according to one embodiment of the disclosure.

According to preferred embodiments of friendly UAS 50, the load limited release mechanisms 24 removably connect the periphery of the capturing device 18 to the suspension rod 20 as depicted in FIGS. 3-4. However, in other embodiments of friendly UAS 50 in which only the peripheral portion of the capturing device 18 is intended to be releasable for repositioning a captured threat UAV 10 to the central portion of the capturing device 18, the load limited release mechanisms 24 may be part of the suspension rod 20 itself. For example, when the suspension rod 20 includes a plurality of segments, the outer segments of the suspension rod 20 may be load-limited such that they are configured to break off or otherwise hinge down with respect to the inner segments. As a result of the breaking/hinging of the outer segments of the suspension rod 20, the peripheral portion of the capturing device 18 is released such that a threat UAV 10 captured in the peripheral portion of the capturing device 18 is repositioned to the central portion of the capturing device.

For purposes of the present disclosure, it should be understood that the "secure connection mechanisms 25" may also be releasable under more extreme space-proportioned weights as compared to the "load limited release mechanisms 24." In other words, the connection mechanisms 25 are referred to as "secure connection mechanisms" because they are intended to be used to carry a threat UAV 10 captured in the central portion of the capturing device 18 to a remote/safe location without releasing the capturing device 18 from the friendly UAV 14. Similarly, the central portion of the capturing device 18 may be referred to as being "securely connected/suspended" even though the central portion may be releasable under more extreme space-proportioned weights. For purposes of the present disclosure, it should also be understood that the "central portion" of the capturing device 18 is the portion of the capturing device 18 suspended more directly underneath the friendly UAV 14 when the capturing device 18 is in the extended capturing position while a "peripheral portion" is a portion of the capturing device that is suspended away from the area directly underneath the friendly UAV 14. In typical embodiments, the capturing device 18 will have one central portion with a peripheral portion on each side of the central portion. However, in other embodiments, the capturing device 18 may include a central portion with only one peripheral portion on one side of the central portion.

With reference to FIGS. 1-4, the adapter plate 19 may also be configured to be released from the friendly UAV 14. In certain embodiments, and particularly the UAS system 50 as described above with respect to FIGS. 3-4 having secure connection mechanisms 25 for securely connecting the capturing device 18 to the central portion of the suspension rod 20, the adapter plate 19 is configured to be released from the friendly UAV 14 by controller 16. For example, friendly UAV 14 may be initially used to transport an arrested threat UAV 10 from a sensitive location to a remote location. Once at the remote location, the adapter plate 19 is released from the friendly UAV 14 by remote controller 16 such that the threat UAV 10 is dropped to the ground at the remote location instead of the sensitive location. In other embodiments, the adapter plate 19 may be configured to be weight releasable such that the entirety of the capturing device 18 and suspension rod 20 are released from the friendly UAV 14 if subjected to too much weight. For example, UAS 50 may be intended to transport an arrested threat UAV 10 as described above with respect to FIGS. 3-4. However, if the captured threat UAV 10 ends up being too heavy (or the capturing device 18 captures or gets caught up in an unintended obstruction), the adapter plate 19 is configured to be weight releasable based on the maximum load able to be carried by the friendly UAV 14 to avoid damage or destruction of the friendly UAV 14.

Figure 5:
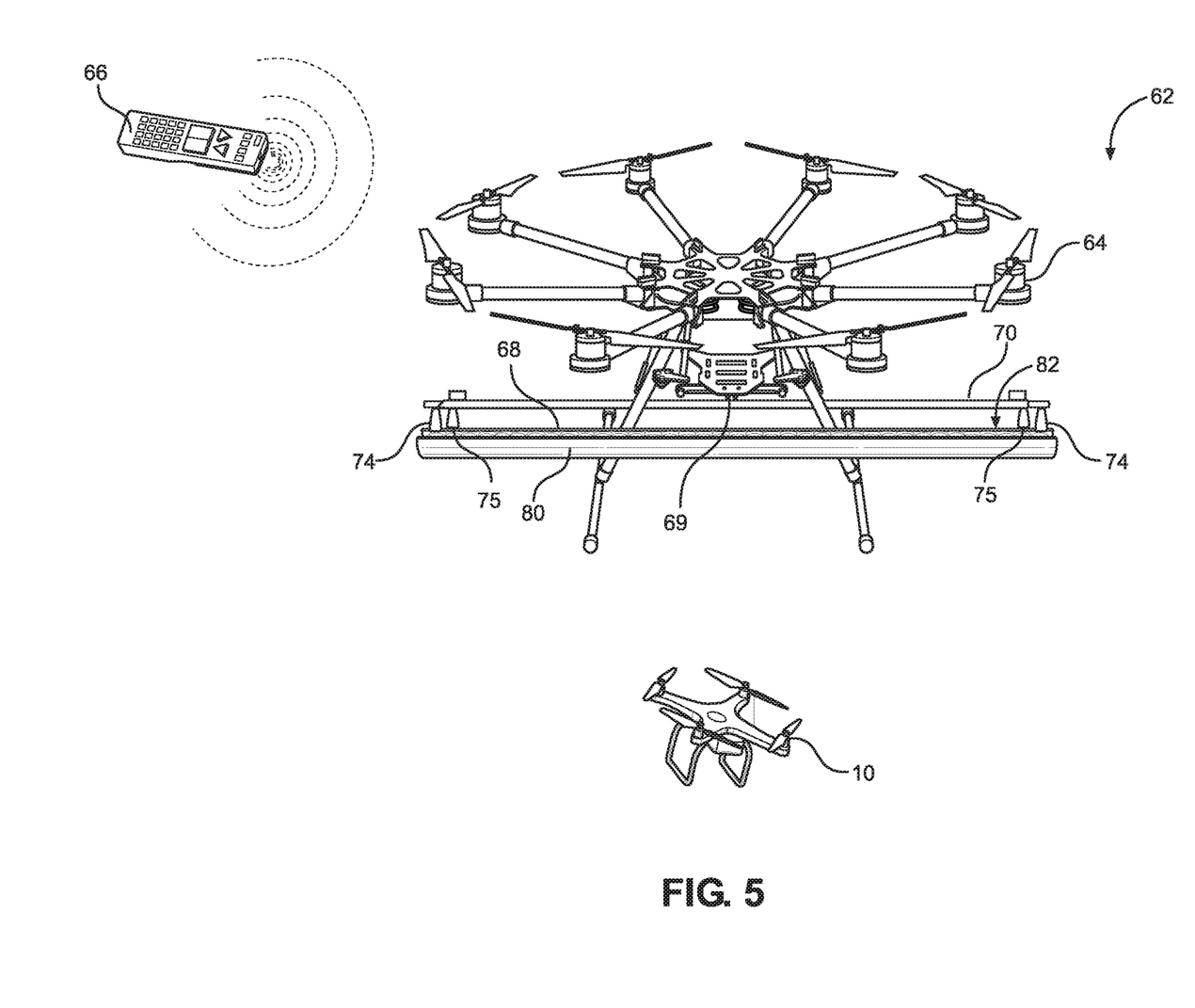
FIG. 5 depicts a friendly UAS having a capturing device in a compact flight position for pursuing a threat UAV according to another embodiment of the disclosure.
Figure 6:
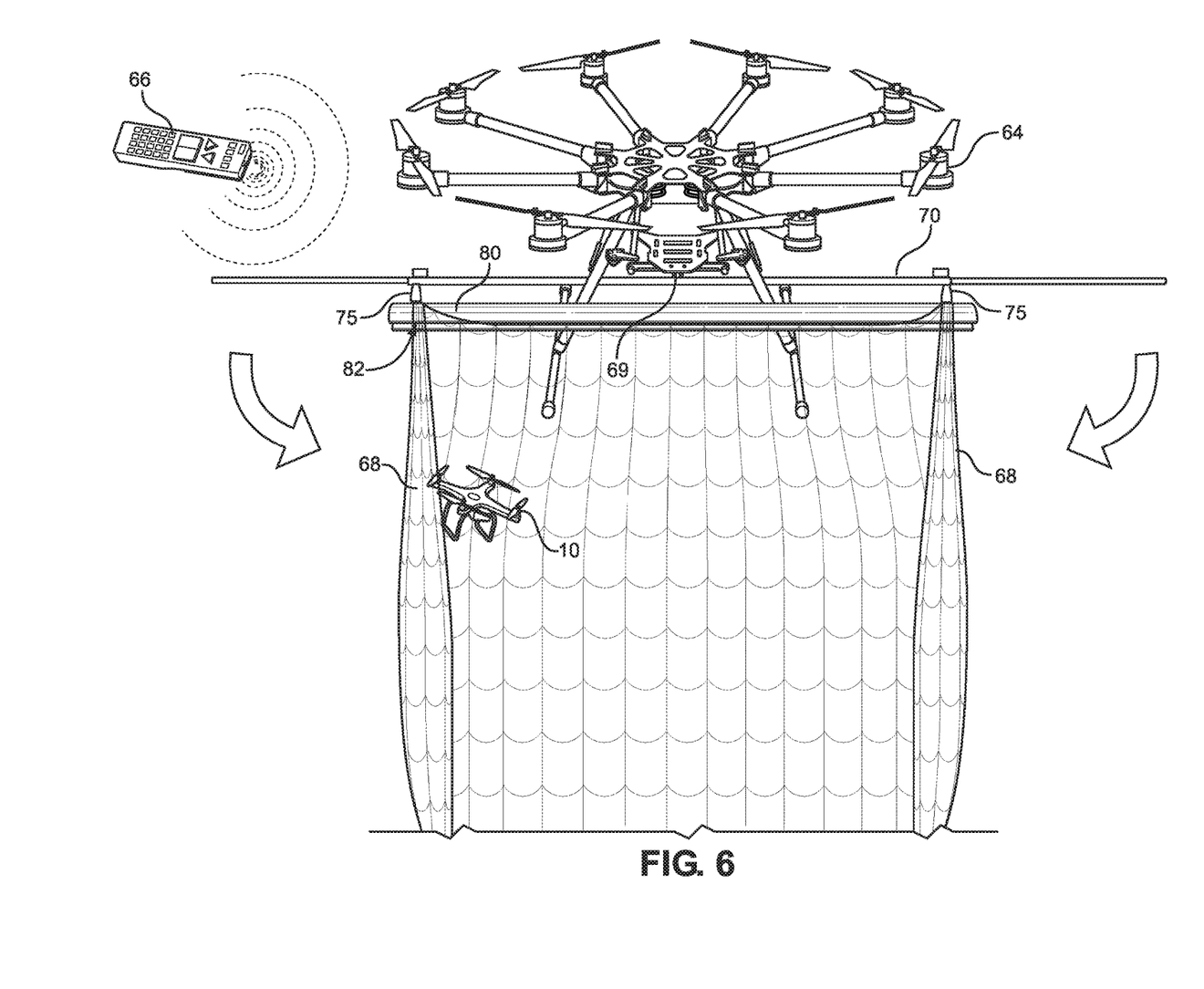
FIG. 6 depicts the friendly UAS of the embodiment of FIG. 5 after arresting the threat UAV in a peripheral portion of the capturing device such that it is being repositioned into the central portion of the capturing device according to one embodiment of the disclosure.

Referring to FIGS. 5-6, another embodiment of the disclosure is provided that includes a friendly UAS 62 that is similar in concept to the embodiment of FIGS. 3-4 in which a friendly UAV 64 is intended to transport a threat UAV 10 to a remote/safe location after capture of the threat UAV 10. According to this embodiment, the friendly UAS 62 similarly includes the friendly UAV 64 that is configured to be operated by a remote controller 66. The friendly UAS 62 and friendly UAV 64 are further configured to include a capturing device 68 typically in the form of a net configured to be suspended from the friendly UAV 64 for capturing the threat UAV 10. However, according to this embodiment, the friendly UAV 64 is preferably selected to have greater capabilities as compared to the Group 1 friendly UAV 14 depicted in FIGS. 1-4. In particular, the friendly UAV 64 is preferably selected to have a greater weight load capacity to be better suited to transport threat UAVs 10 having a greater weight (e.g., threat UAVs 10 carrying weapon capabilities or other payloads) to a remote/safe location. An example of a preferred friendly UAV 64 according to this embodiment is the commercially available DJI S1000 as depicted in FIGS. 5-6.

To assist the friendly UAV 64 in pursuing a threat UAV 10, friendly UAV 64 includes a capturing device expanding system configured to be controlled by controller 66 during flight to allow for enhanced aerodynamic storage of the capturing device 68 while the friendly UAV 64 is in aerial pursuit. The capturing device expanding system preferably includes a suspension rod 70 secured to the friendly UAV 64 via adapter 69. The suspension rod 70 is able to be expanded from a compact position to an extended position to expand the capturing device 68 horizontally (i.e., expand the width of the capturing device 68) as described above with respect to the embodiments of FIGS. 1-4. Additionally, capturing device expanding system preferably also includes a housing portion 80 configured to move from a housing configuration (FIG. 5) for housing the capturing device 68 during flight to a releasing configuration (FIG. 6) for expanding the capturing device 68 vertically (i.e., releasing the capturing device 68 towards the ground) when desired to capture a threat UAV 10.

With reference to FIG. 5, the housing portion 80 according to one exemplary embodiment is a hollow-tube shape that extends generally along the length of the suspension rod 70 in its compact position. The housing portion 80 includes an open top 82 disposed adjacent the suspension rod 70 when the housing portion 80 is in the housing configuration such that the capturing device 68 is able to be dropped or otherwise inserted into the housing portion 80 through the open top 82. With reference to FIG. 6, controller 66 is then able to rotate the housing portion 80 such that the open top 82 becomes an open bottom to release/drop the capturing device 68 towards the ground when desired to capture a threat UAV 10.

With continued reference to FIGS. 5-6, the friendly UAS system 60 of this embodiment is configured to operate similarly to the embodiment of FIGS. 3-4 once the capturing device 68 is in the expanded/capturing position. In this regard, the friendly UAS system 60 preferably includes load limited release mechanisms 74 only along the periphery of the suspension rod 70 and secure connection mechanisms 75 for securely attaching the central portion of the capturing device 68 to the central portion of the suspension rod 70. Thus, secure connection mechanism 75 allow for the friendly UAV 64 to transport a threat UAV 10 captured in capturing device 68 to a remote/safe location while the load limited release mechanisms 74 provide a releasable portion of capturing device 68 to reposition a threat UAV 10 captured in the releasable portion to the central portion of the capturing device 68. Further adapter plate 69 may be configured to be selectively releasable using controller 66 to drop the capturing device 68 and suspension rod 70 when desired, such as during emergency situations or once the threat UAV 10 is removed to a remote/safe location.

Figure 7:
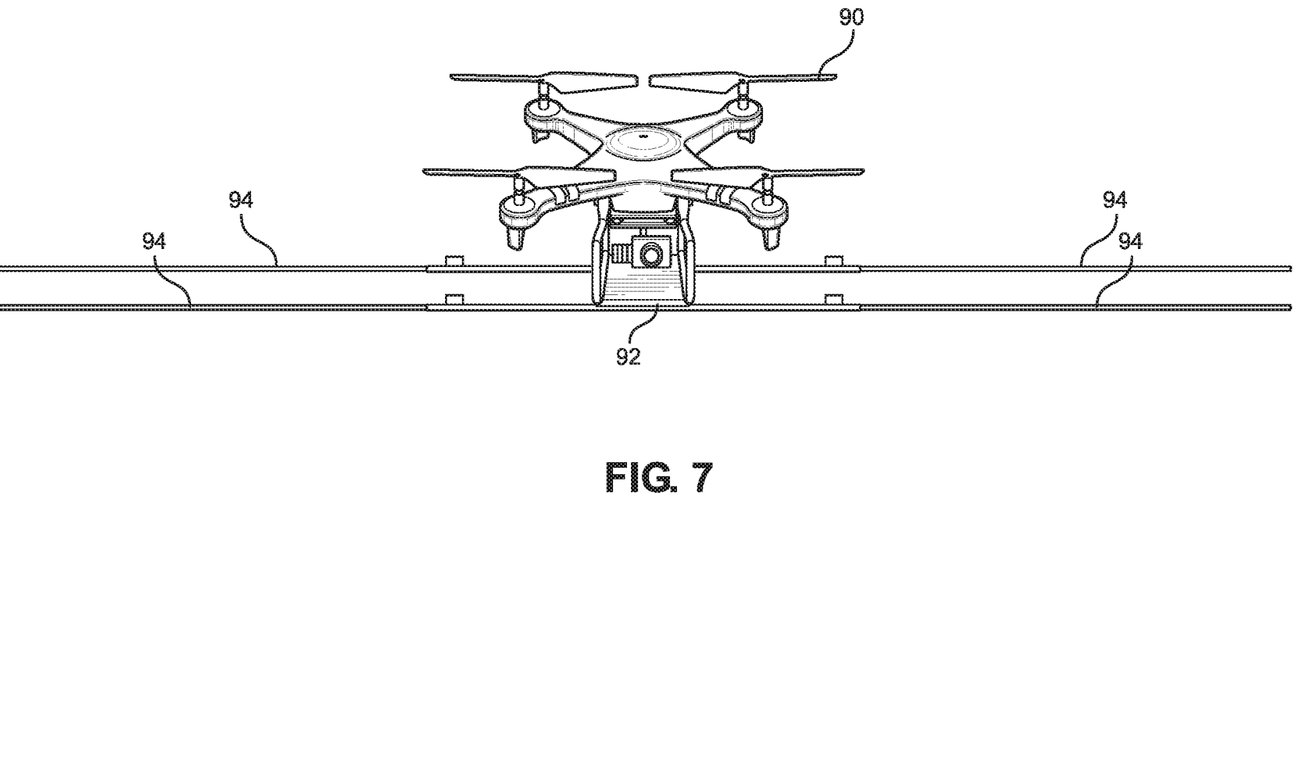
FIG. 7 depicts a friendly UAV including a plurality of suspension rods for suspending multiple capturing devices to be used for capture of multiple threat UAVs during a single mission according to one embodiment of the disclosure.

Referring to FIG. 7, and according to another aspect of the disclosure, a friendly UAV 90 may be modified to include multiple arresting assemblies using a series of adapters. Each adapter connects one of the arresting assemblies to the friendly UAV 90 via an adapter plate 92. Each arresting assembly then includes at least a suspension rod 94 for suspending a capturing device substantially as described above with respect to the embodiments of FIGS. 1-6. In other words, the friendly UAV 90 includes a series of arresting assemblies secured to the friendly UAV 90 where each arresting assembly has its own capturing device so that the friendly UAV 90 could be used against multiple threat UAVs 10 during a single operation. For example, one operation could include loading a plurality of arresting assemblies to the friendly UAV 90 by connecting adapters/cartridges to a series of corresponding receivers disposed in adapter plate 92 underneath the friendly UAV 90 prior to flight of the friendly UAV 90. The friendly UAV 90 then begins its pursuit of a threat UAV 10. When the friendly UAV 90 is in the proximity of a threat UAV 10, the capturing device of one of the arresting assemblies is expanded to its capturing position. Upon capture, the arresting assembly may be configured to immediately release the captured threat UAV 10 in the capturing device substantially as described above with respect to the embodiment of FIGS. 1-2 or configured to carry the captured threat UAV 10 to a remote location substantially as described above with respect to FIGS. 3-4 or FIGS. 5-6. Once the captured threat UAV 10 is released from the friendly UAV 90 in the desired manner, the friendly UAV 90 may again be flown in the proximity of another threat UAV 10. This process can be repeated as many times as needed depending on the number of arresting assemblies connected to the friendly UAV 90.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An unmanned aerial system for defeating a threat unmanned aerial vehicle, the system comprising:
   a friendly unmanned aerial vehicle;
   a capturing device configured to be suspended from the friendly unmanned aerial vehicle for arresting the threat unmanned aerial vehicle;
   a horizontally-oriented suspension rod connected to the friendly unmanned aerial vehicle;
   one or more load limited release mechanisms for removably suspending a peripheral portion of the capturing device to a peripheral portion of the suspension rod, the one or more load-limited release mechanisms being configured to release the peripheral portions of the capturing device upon the capturing device arresting the threat unmanned aerial vehicle in the peripheral portion of the capturing device such that the arrested unmanned aerial vehicle is repositioned into a central portion of the capturing device;
   one or more secure connection mechanisms securely suspending the capturing device from the central portion of the suspension rod, the suspension rod being spring-loaded and linearly, horizontally-extendable to opposite sides of the friendly unmanned aerial vehicle from a compact storage position to an extended capturing position such that opposite ends of the suspension rod are parallel, the one or more load-limited release mechanisms removably suspending a releasable portion of the capturing device from the suspension rod of the friendly unmanned aerial vehicle, the one or more load-limited release mechanisms and one or more secure connection mechanisms configured to release the releasable portion of the capturing device from the friendly unmanned aerial vehicle upon the capturing device arresting the threat unmanned aerial vehicle in the releasable portion,
   wherein the releasable portion of the capturing device includes the entire capturing device such that the capturing device is fully released from the suspension rod of the friendly unmanned aerial vehicle after the arresting of the threat unmanned aerial vehicle within any portion of the capturing device,
   wherein the capturing device includes one or more deployable parachutes that are connected to the capturing device and stored underneath the friendly unmanned aerial vehicle prior to deployment, the one or more deployable parachutes being configured to be deployed upon the capturing device being released from the friendly unmanned aerial vehicle.

2. The system of claim 1, further comprising an adapter for removably connecting the suspension rod to the friendly unmanned aerial vehicle and a controller configured to communicate with the friendly unmanned aerial vehicle, the adapter configured to release the suspension rod and capturing device from the unmanned aerial vehicle upon commands from the controller.

3. The system of claim 1, wherein the one or more load-limited release mechanisms are configured to release the releasable portion of the capturing device based on both a weight of the arrested threat unmanned aerial vehicle and a sharp movement of the friendly unmanned aerial vehicle.

* * * * *